(12) United States Patent
Han et al.

(10) Patent No.: US 7,424,613 B2
(45) Date of Patent: Sep. 9, 2008

(54) METHOD OF CONSTRUCTING DOMAIN BASED ON PUBLIC KEY AND IMPLEMENTING THE DOMAIN THROUGH UNIVERSAL PLUG AND PLAY (UPNP)

(75) Inventors: Sung-hyu Han, Seoul (KR); Myung-sun Kim, Uiwang-si (KR); Jung-yon Cho, Seoul (KR); Yang-lim Choi, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 701 days.

(21) Appl. No.: 10/953,571

(22) Filed: Sep. 30, 2004

(65) Prior Publication Data

US 2005/0086514 A1   Apr. 21, 2005

(30) Foreign Application Priority Data

Oct. 2, 2003   (KR) ............... 10-2003-0068837

(51) Int. Cl.
*H04L 9/00* (2006.01)

(52) U.S. Cl. .................................. 713/168; 713/175

(58) Field of Classification Search ......... 713/168–169, 713/175; 726/2–4; 380/282, 285
See application file for complete search history.

(56) References Cited

U.S. PATENT DOCUMENTS 7,031,945 B1* 4/2006 Donner ........................ 705/64
2003/0135552 A1* 7/2003 Blackstock et al. ......... 709/205

FOREIGN PATENT DOCUMENTS

| JP | 2001-203680 A | 7/2001 |
| JP | 2001-352321 A | 12/2001 |
| JP | 2002-291039 A | 10/2002 |
| JP | 2003-198544 A | 7/2003 |

OTHER PUBLICATIONS

UPnP AV Architecture V: 0.83, Jun. 12, 2002.

* cited by examiner

*Primary Examiner*—Hosuk Song
(74) *Attorney, Agent, or Firm*—Sughrue Mion, PLLC

(57) ABSTRACT

A method of constructing a unique domain for preventing content from being illegally used by an unauthorized third person in a public key-based architecture and applying the constructed domain to a home network using universal plug and play (UPnP). The method of the present invention includes selecting one of controlled devices that are operable as a master device and determining the selected device as the master device; performing device authentication in such a manner that other controlled devices receive a secret information block from the determined master device and create certificates; and determining slave devices by selecting one or more devices among the authenticated controlled devices.

7 Claims, 12 Drawing Sheets

METHOD OF CONSTRUCTING DOMAIN BASED ON PUBLIC KEY AND IMPLEMENTING THE DOMAIN THROUGH UNIVERSAL PLUG AND PLAY (UPNP)

BACKGROUND OF THE INVENTION

This application claims priority of Korean Patent Application No. 10-2003-0068837 filed on Oct. 2, 2003 in the Korean Intellectual Property Office, the disclosure of which is incorporated herein in its entirety by reference.

1. Field of Invention

The present invention relates to the authentication of devices present in a domain, and more particularly, to a method of constructing a unique domain for preventing content from being illegally used by an unauthorized third person in a public key-based architecture and applying the constructed domain to a home network using universal plug and play (UPnP).

2. Description of the Prior Art

As digital and communication technologies have increasingly advanced, a variety of content such as audio or video materials have become popular. There have been proposed a variety of techniques for protecting content against illegal copying and unauthorized distribution. In particular, there have been developed techniques by which content is encrypted and only particular devices can decrypt the encrypted content using predetermined rules. For example, the techniques include a DVD content scrambling system, content protection for recordable media (CPRM), digital transmission content protection (DTCP), high definition content protection (HDCP), content protection system architecture (CPSA), digital rights management (DRM) and the like.

Specifically, with the development of the home network field, there have been proposed techniques for protecting content on a home network. Typical examples of the techniques include "SmartRight" proposed by Thomson Corporation, "OCCAM (Open Conditional Content Access Management") proposed by Sysco Corporation, or "xCP (extensible Content Protection) Cluster Protocol" proposed by IBM.

"SmartRight" is a technique by which each device constituting a home network has a smart card including a public key certificate and a key for the home network is created by the exchange of certificates among devices using the smart cards.

"OCCAM" is a technique by which respective devices in a home can use content by using a unique "ticket" for each piece of content.

"xCP Cluster Protocol" is a technique based on broadcast encryption, by which the concept of a domain called "cluster" is employed and devices belonging to the same cluster can freely use content among the devices.

As shown in FIG. 1, conventional domain management comprises a master device 110 and slave devices 120, 130 and 140 within an authenticated home domain 100. Domain management is performed between the master device and the slave devices. The process of reproducing content based on the 'xCP Cluster Protocol' in accordance with such a configuration of the master device and the slave devices will be described with reference to FIG. 2. The process can be roughly divided into the following processes: a cluster-forming process (S201), a device-authenticating process (S202), a content-encrypting process (S203), and a content-decrypting process (S204). The detailed description thereof will be made below. A server that initially connects with a given home network creates a binding ID (hereinafter, referred to as "$ID_b$") for the home network (S200). An $ID_b$ may be, a unique identifier for a server established upon manufacture of the server or arbitrarily established by a user. When an $ID_b$ is thus established, a cluster identified with $ID_b$ is formed.

When a device intends to use content present in the server, the device extracts a media key (hereinafter, referred to as "$K_m$") from a media key block (MKB) by using its own device key set (S210). Thereafter, the device creates its own unique key $K_p$ by using "$K_m$" extracted in step S210 and its own identifier $ID_p$ (S212).

When the device intends to go through device authentication, it requests the server to authenticate the device itself (S214).

Specifically, the device sends its own unique "$ID_p$," a "type" indicating the kind of device, and a hash value of the "type" and "$ID_p$" derived using "$K_p$," i.e. h=MAC($ID_p$||type) $K_p$, to the server present in the cluster or an authentication server present outside the home network.

The server obtains $K_p'$ from $K_m$ and $ID_p$, and checks whether a hash value, h'=MAC($ID_p$||type)$K_p'$, which is obtained using $K_p'$, is identical to the value h already received from the device.

If it is determined that the value h is equal to the value h', the server sends the device E($ID_b$) $K_p$, which is obtained by encrypting $ID_b$ using $K_p$, and the unique identifier $ID_p$ of the device, and then adds $ID_p$ to an authentication table of the server, "auth.tab." The authentication for the device can be accomplished by extracting $ID_b$ from E($ID_b$) $K_p$ received from the server (S216).

After the device authentication has been completed, the server encrypts content to be transmitted to the device (S203). A binding key (hereinafter, referred to as "$K_b$") is first created using $ID_b$, auth.tab and $K_m$. Here, $K_b$ meets a formula such as $K_b$=H[$ID_b$ ⊕ H[auth.tab], $K_m$].

After $K_b$ is created, the server encrypts the content using a title key (hereinafter, referred to as "$K_t$") for protecting the content (S222). Meanwhile, each piece of content contains usage rule (UR) information including copy control information, information on whether the content is allowed to be distributed to the outside, a right to use the content, a valid use period, and the like. The UR information and $K_t$ are encrypted using $K_b$ to produce E($K_t$ ⊕ H[UR]$K_b$) (S224).

Meanwhile, the device receives the "auth.tab" from the server, and $K_b$ is obtained from $K_b$=H[$ID_b$ ⊕ H[auth.tab], $K_m$] using the previously extracted $K_m$ and $ID_b$ (S230). Further, after $K_t$ is extracted from E($K_t$ ⊕ H[UR]$K_b$) (S232), the content received from the server is decrypted using the extracted $K_t$ (S234).

In the xCp cluster protocol operating as described above, all devices capable of communicating with the server can automatically join a domain without the process of selecting devices that will join the domain. Further, since $ID_b$ is fixed, the values of $K_b$, $K_t$, and the like can be calculated even when the device is put outside the domain. However, there is inconvenience in that whenever each device creates its new $K_b$, the device should receive the auth.tab from the server to calculate the new $K_b$. Accordingly, there is a need for more secure protection of content through construction of a unique home domain and involvement of a user in device authentication.

Meanwhile, DRM serves as an essential component in the development of the digital industry and also plays an essential role in a home network. Accordingly, an increased need exists for implementing the domain management model described above in the home network. As described above, the related art for applying the domain management technique to a home network uses a direct communication scheme between the master and slave devices in the home network, as shown in FIG. 1. This scheme needs to develop communication protocols adapted for respective domain management. Thus, there is a problem in that compatibility with respective devices is deteriorated. Accordingly, measures to efficiently solve the problem are required. Recently, a lot of companies all over the world have been interested in UPnP (Universal Plug and Play), which has emerged as home network middleware, and produce many products supporting UPnP. UPnP has many advantages in that it can be smoothly incorporated into existing networks due to the use of conventional standard Internet protocols and does not depend on specific operating systems, physical media, or the like. However, since a method of implementing domain management through UPnP remains unknown, there is a need for a method of effectively implementing domain management using UPnP.

SUMMARY OF THE INVENTION

The present invention is conceived to solve the problems in the related art. An object of the present invention is to provide a method of more safely constructing a domain independent of the outside through the direct involvement of a user in constructing the domain, and preventing content from being illegally used by a third person.

Another object of the present invention is to provide a method of implementing more efficient domain management using UPnP when the domain-constructing method is applied to a home network.

According to an aspect of the present invention for achieving the objects, there is provided a method of constructing a domain based on a public key and implementing the domain through UPnP so that a unique domain can be constructed to allow only an authorized user to use content in a public-key based architecture in a home network, comprising a first step of selecting one of controlled devices that are operable as a master device and determining the selected device as the master device; a second step of performing device authentication in such a manner that other controlled devices receive a secret information block from the determined master device and create certificates; and a third step of determining slave devices by selecting one or more devices among the authenticated controlled devices.

The first step may comprise the steps of: notifying a control point that the controlled devices are connected; obtaining, by the control point, device information and DRM information of the controlled devices; selecting the master device among the controlled devices by using the DRM information; and setting the controlled device selected as the master device to a master mode and providing a list of devices to the controlled devices.

The second step may comprise the steps of: receiving, by the determined master device, the secret information block from an external server; delivering the received secret information block to the controlled devices except the master device; extracting secret values and creating the certificates using the delivered secret information block; and verifying the certificates and preparing a list of authenticated devices by using the created certificates, device IDs and public keys.

The third step may comprise the steps of: if the devices authenticated in the second step have no domain attributes, displaying a list of these devices to the user; selecting the slave devices among the listed devices; receiving a list of selected slave devices and creating a domain ID and a domain key; and encrypting the domain ID and the domain key using public keys.

In the method, important ones of functions of the control point in UPnP may be taken over by the master device and the control point deals with tasks related to user interfaces.

Further, the master device and the slave devices may be determined after manager authentication is performed by obtaining manager authentication information from the master device.

Moreover, selecting the master device and the slave devices may be performed by means of user selection through user interfaces.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Hereinafter, embodiments of the present invention will be described with reference to the accompanying drawings.

Figure 1:
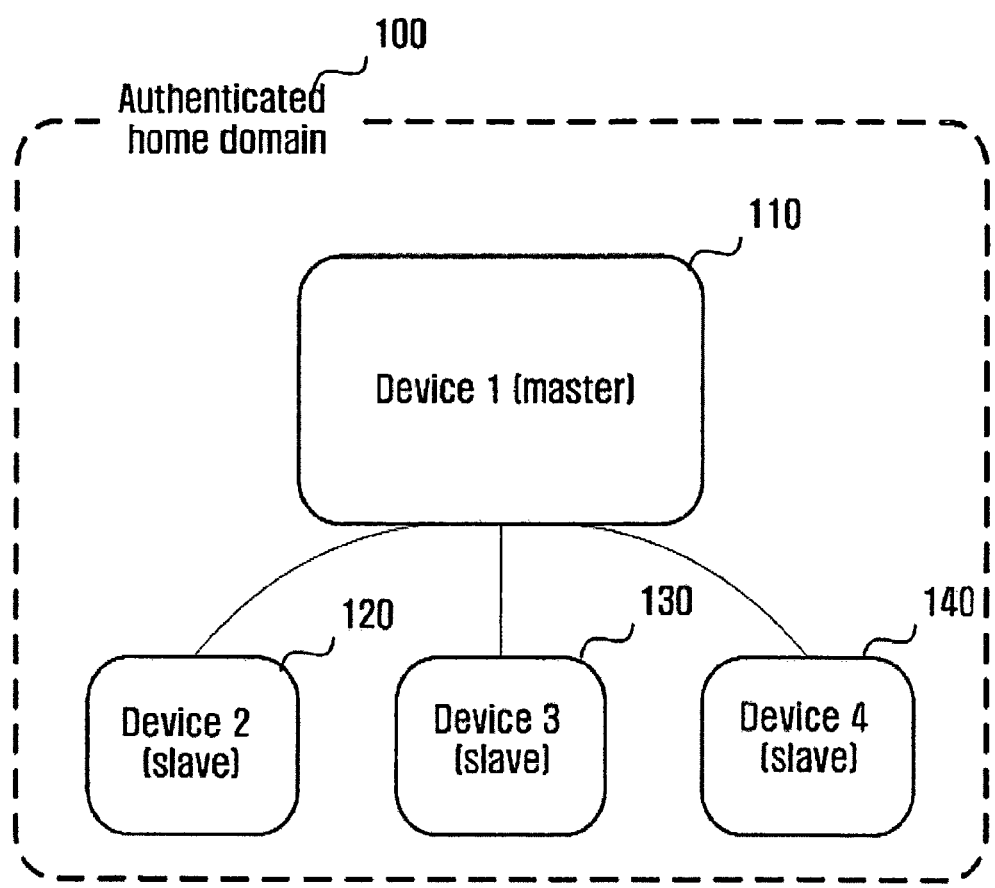
FIG. 1 shows a conventional domain management configuration.
Figure 2:
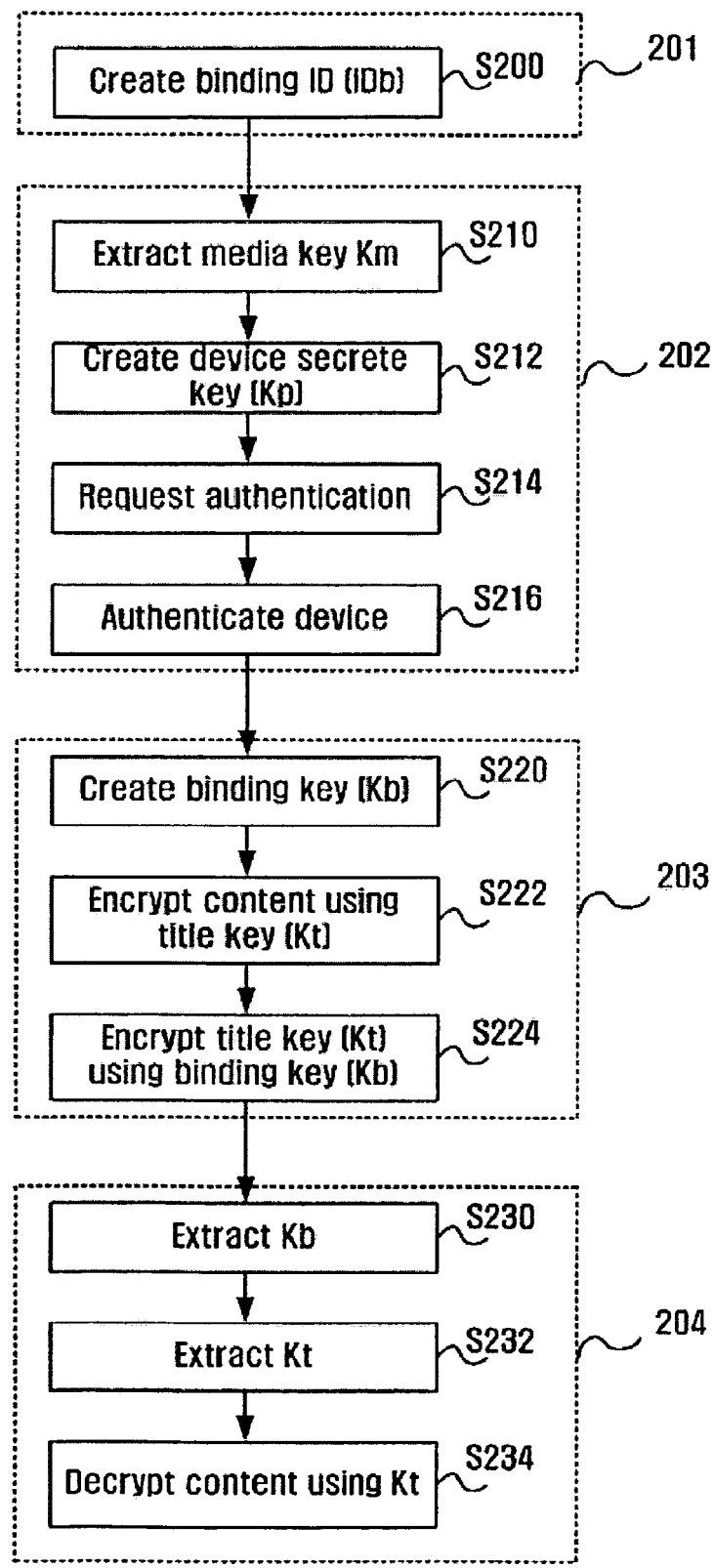
FIG. 2 is a flowchart illustrating the process of reproducing content based on 'xCP Cluster Protocol' in accordance with a conventional master-slave configuration.
Figure 3:
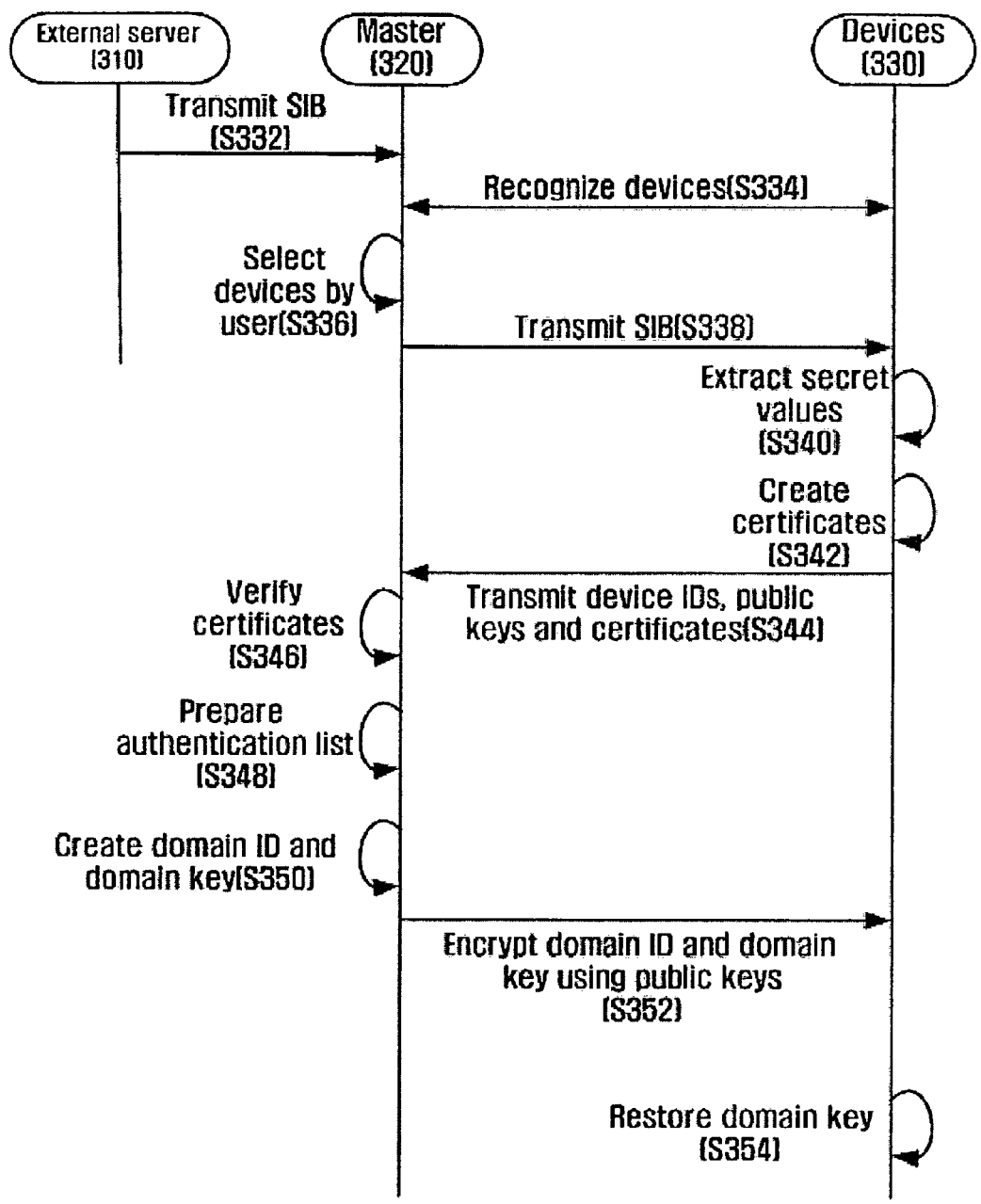
FIG. 3 illustrates a method of constructing a domain in a public key-based architecture according to the present invention.

FIG. 3 illustrates a method of constructing a domain in a public key-based architecture according to the present invention.

For the sake of convenience of description of the present invention, it is assumed that each device requesting a master device, which provides content, to transmit content thereto has a set of unique secret keys and a public key or a public key-creating function upon manufacture of the device. At this time, the set of secret keys are used to extract a secret value from a secret information block (hereinafter, referred to as "SIB") provided in a broadcast encryption manner. The SIB is information for verifying the revocation of devices. Revoked devices cannot extract an intended secret value from the SIB, whereas legitimate devices can extract a common secret value.

In a single domain, there is a master 320 involved in constructing a domain. The master 320 receives a SIB from an external server 310 in a broadcast encryption manner (S332). Thereafter, the master 320 recognizes the presence of devices 330 in the domain in such a manner that the devices 330 inform the server that they exist in the domain or the master itself 320 discovers the devices 330 through a wired or wireless network (S334).

When the master 320 provides a user with the devices 330, which have been recognized by the master, by displaying them on a display unit of the master, the user selects devices 330 that the user wants to register with the domain among the displayed devices (S336). Then, the master 320 sends the SIB, which have been already received from the external server 310, to the devices 330 selected by the user (S338). Each of the devices 330 that have received the SIB extracts a secret value from the SIB (S340), and prepares a certificate for its own public key using the extracted secret value (S342).

When each of the devices 330 sends its own certificate, unique identifier (ID) and public key to the master 320 (S344), the master 320 verifies the certificate in order to verify that the device is a legitimate device (S346). Then, the master 320 prepares an authentication list in which unique identifiers (IDs) and public keys of authenticated devices are recorded (S348). The number of devices that can be authenticated is limited by a user.

After the master 320 prepares the authentication list, the master creates a unique domain ID and a domain key using information on the devices included in the authentication list and a random number created by the master itself (S350). The domain ID is a secret key shared among only devices belonging to a domain formed by the user's selection and is simultaneously changed whenever there are changes in members constituting the domain. The domain ID is used as a discriminator for distinguishing a domain from other domains.

The master 320 encrypts the domain ID and the domain key using respective public keys of the authenticated devices 330 present in the domain and then transmits the encrypted domain ID and domain key to the authenticated devices 330. The devices 330 restore the domain key using their own secret keys (S354). Thus, the domain for using the content is finally formed. When the domain for sharing the content is formed, the master 320 encrypts the content using a content key that in turn is encrypted using the domain key. When the devices, which want to use the content, decrypt the encrypted content using the domain key, the devices can use the content.

Figure 4:
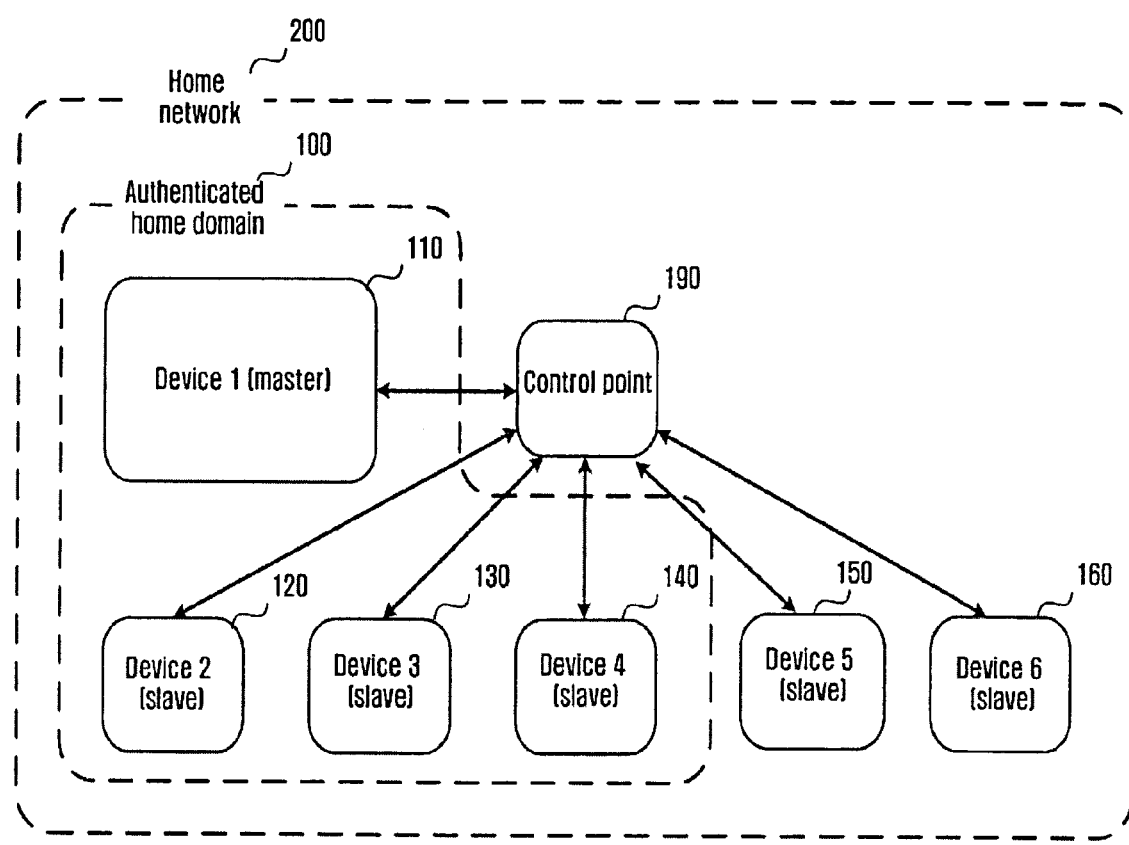
FIG. 4 is a block diagram showing an example in which the domain-constructing method of the present invention is applied to UPnP.

FIG. 4 is a block diagram showing an example in which the domain-constructing method of the present invention is applied to UPnP.

Each of controlled devices 110 to 160 receives/sends commands and also provides their own services under the control of a control point 190. A domain is constructed by designating one device of the controlled devices as a master device 110 and designating devices 120, 130 and 140, which have been selected by a user, among the remaining devices, as slave devices. Among the controlled devices, the devices 150 and 160 that have been not designated as master or slave devices, i.e. the ones that have not been included in the domain are called guest devices. The master device 110 and the slave devices 120 to 140 construct an authenticated home domain, and the control point 190 and the controlled devices 110 to 160 constructs a home network 200 as a whole.

Figure 5:
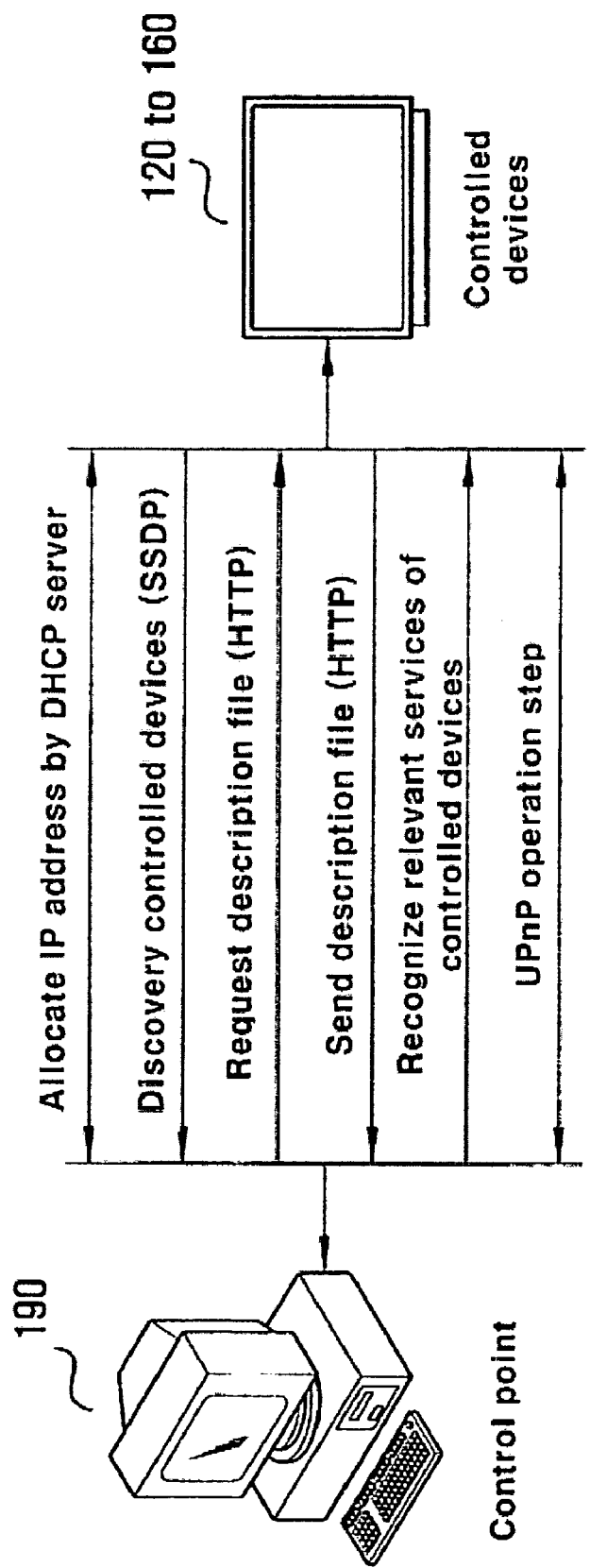
FIG. 5 illustrates a general UPnP operation performed between a control point and controlled devices.

FIG. 5 illustrates a general UPnP operation performed between the control point and the controlled devices. First, an addressing step is performed. UPnP networking is based on a TCP/IP protocol of which an essential point is an addressing function. Each device should have a dynamic host configuration protocol (DHCP) client. When the device is first connected to a network, the device searches for a DHCP server. If there is a DHCP server, the device uses an IP address allocated thereto. If there is no available DHCP server, the device uses an "auto IP" to secure an address.

Next, a discovery step is performed. Once the device is connected to the network and a proper address is allocated thereto, a discovery operation can be performed. The discovery operation is processed using a simple service discovery protocol (SSDP). When the device is added to the network, the SSDP functions to notify the control point present in the network of services provided by the device.

Next, a description step is performed subsequent to the UPnP networking. Although the control point has discovered the device, the control point still has little information on the device. If the control point intends to obtain detailed information on the device and its function and cooperates with the device, the control point should check a description of the device from a discovery message and a URL provided by the relevant device. The UPnP description of the device is expressed in XML, and includes unique manufacture information of the manufacturer of the device (for example, model name, serial number, manufacturer's name, manufacturer's URL, etc). Further, this description also includes lists of embedded devices and services as well as URLs for control, eventing and presentation.

After the aforementioned steps of addressing, discovery and description, a UPnP step is substantially performed. The UPnP step is performed through operations for control, eventing, presentation and the like. In the control operation, the control point secures a description of the device and then performs indispensable tasks for control of the device. In order to control the device, the control point sends an operation command to the device for a service provided by the device. To this end, the control point sends a proper control message to a control URL (available from the device description) for the device's service. The control message is also expressed in XML using a simple object access protocol (SOAP). In response to the control message, the relevant service then provides a specific operation value or a fault code.

In the eventing operation, when each device is subjected to a change in its status due to the reception of the command, it notifies the control point of the status change through an event message. The event message includes the names of one or more status variables and the current values of these variables, and is expressed in XML and formatted using a generic event notification architecture (GENA). The contents of the event are periodically updated and the control point is continuously notified of the updated contents of the event. Further, a subscription may be canceled using the GENA.

As for the presentation operation, if the device has a URL for presentation, the control point can search a page through the URL and load the page in a browser. Users can control the device or refer to the status of the device using the page. The level at which these functions can be performed depends on the presentation page and a specific function of the device.

Figure 6:
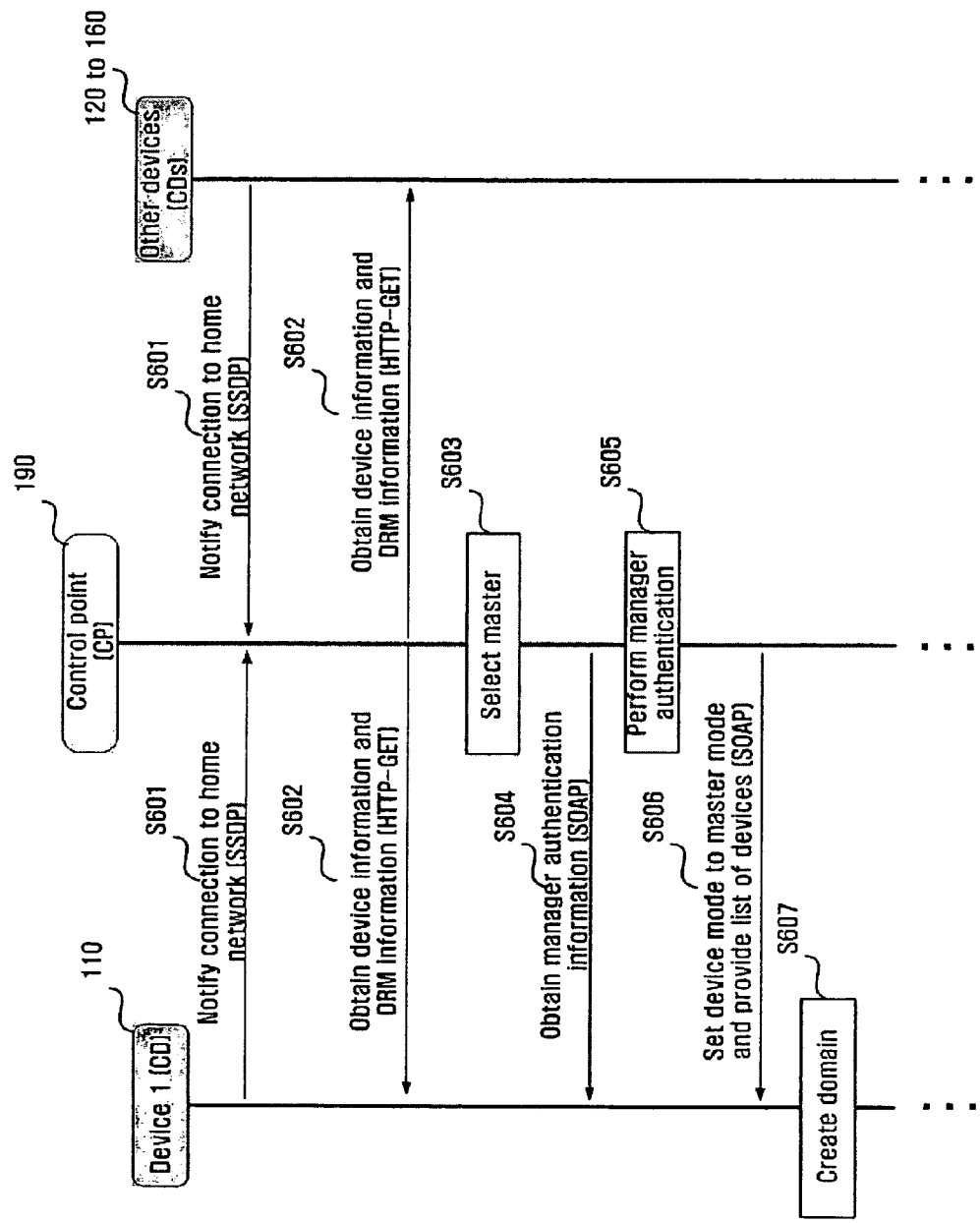
FIG. 6 illustrates the process of determining a master device according to a first embodiment of the present invention.
Figure 7:
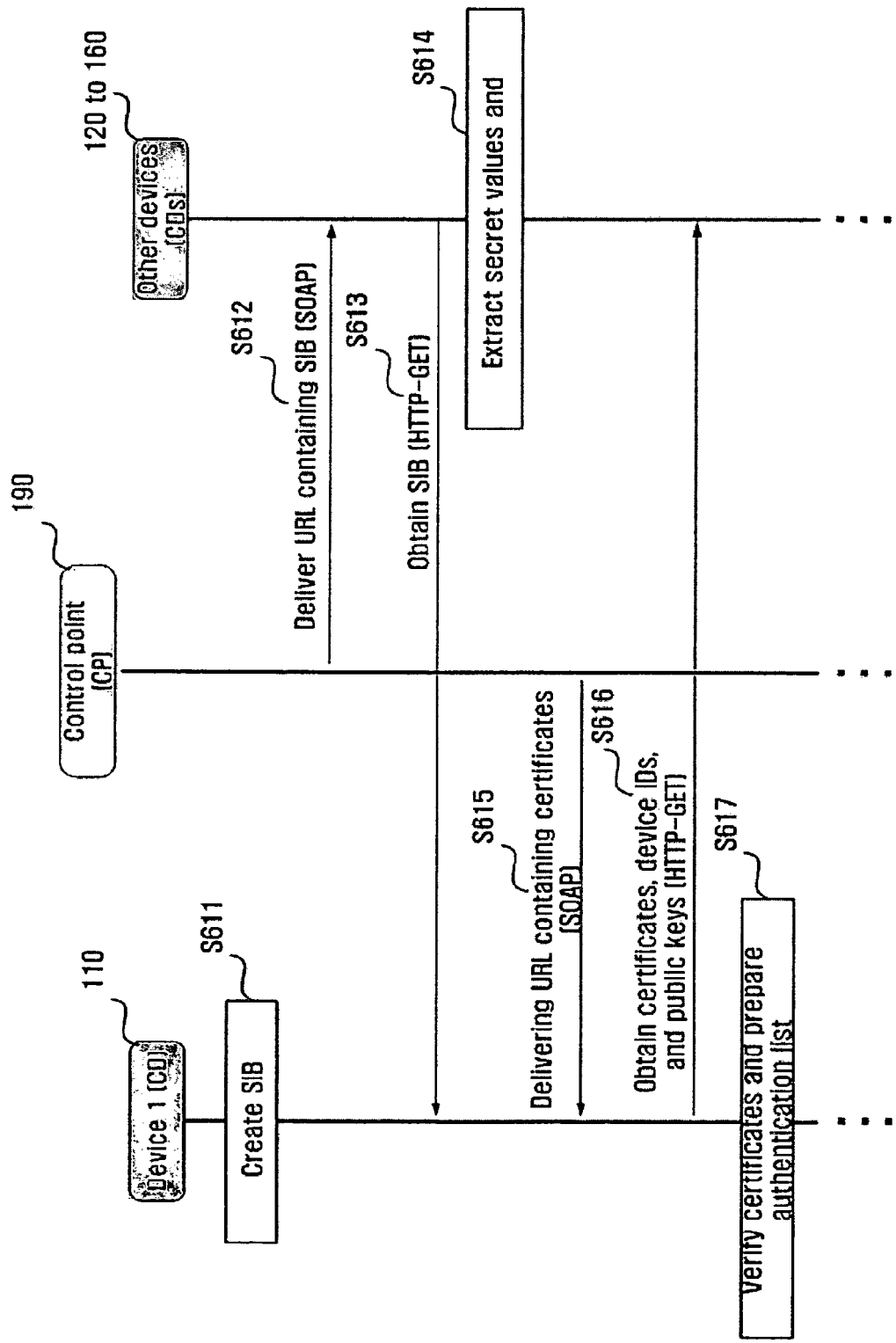
FIG. 7 illustrates a device-authenticating process performed subsequent to the process illustrated in FIG. 6 according to the first embodiment of the present invention.
Figure 8:
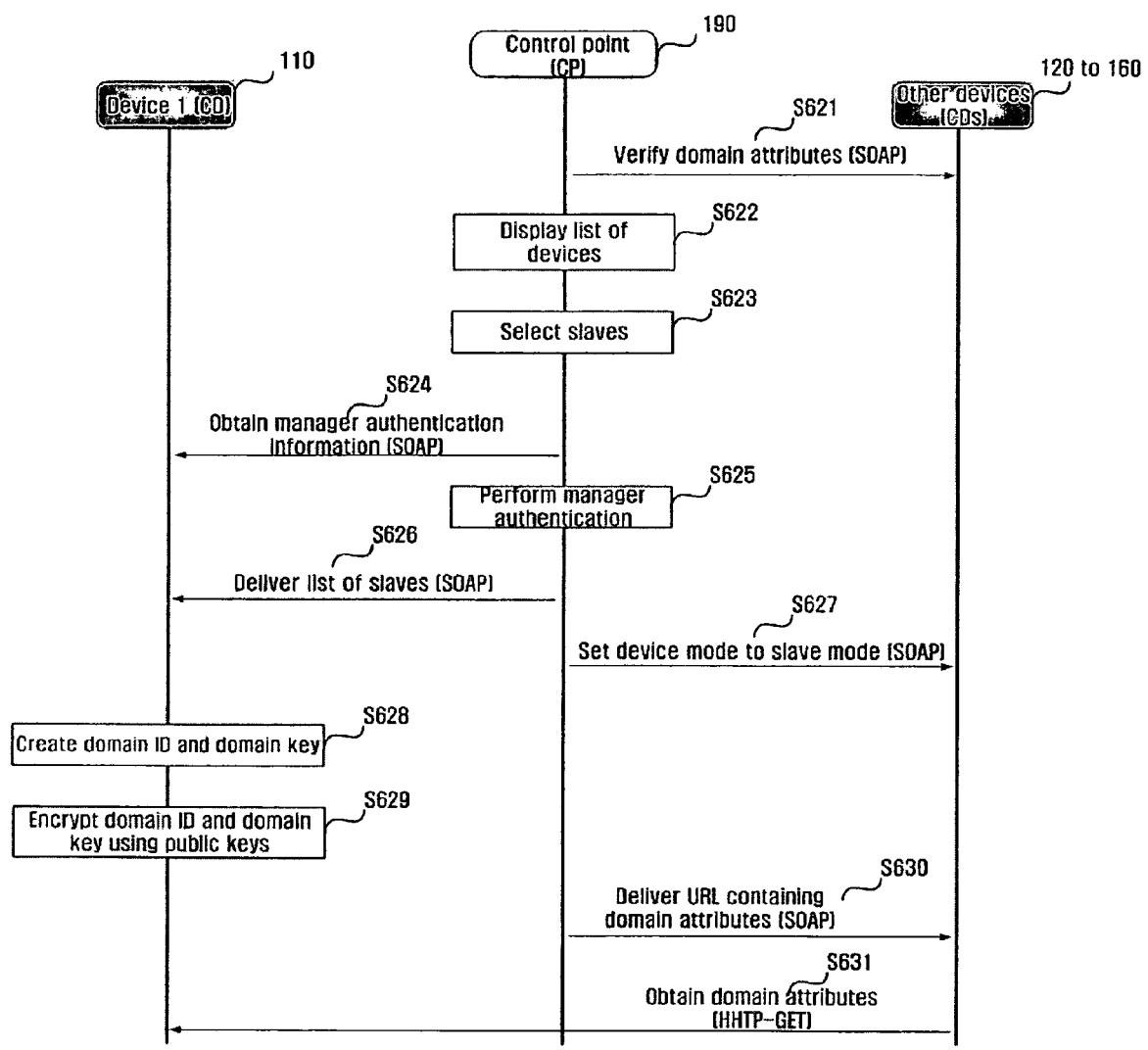
FIG. 8 illustrates the process of determining a slave device that is performed subsequent to the process illustrated in FIG. 7 according to the first embodiment of the present invention.

FIGS. 6 to 8 illustrate processes performed according to a first embodiment of the present invention. Among the figures, FIG. 6 illustrates the process of determining a master device.

First, all the controlled devices 110 to 160 notify the control point 190 that they have been connected to the home network by using the SSDP (S601). Then, the control point 190 obtains device information and DRM information from the devices 110 to 160 (S602) through a HTTP. Here, device information means general device information for use in UPnP, and DRM information means a device attribute and a device mode. The device attribute is a value for use in determining whether the controlled device can be operated as a master device in the domain. Further, the device mode is a value enabling determination on whether the device is currently operated as a master, slave or guest. All the controlled devices are initially set as guests. Thereafter, if the devices are set as a master or slaves, the value of the device mode may be changed.

Figure 9A:
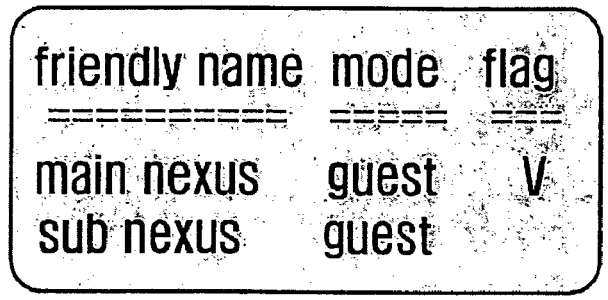
FIG. 9A shows a user interface for receiving a user's selection to select a master device.

It is determined from the device mode of the DRM information whether there is a controlled device operating as a master. If there is no device operating as a master, one of the controlled devices that can be operated as a master device, is selected (S603). Setting a device as a master in such a manner is accomplished by means of user selection through a user interface of the control point 190. An example of the user interface is shown in FIG. 9*a*. In the user interface, there are shown "main nexus" and "sub nexus" which are operable as a master and currently set as guests. In order to select a master, a user simply marks a check for one of the devices that the user desires to designate as the master. In the present example, controlled device 1 110 is selected as the master.

Figure 9B:
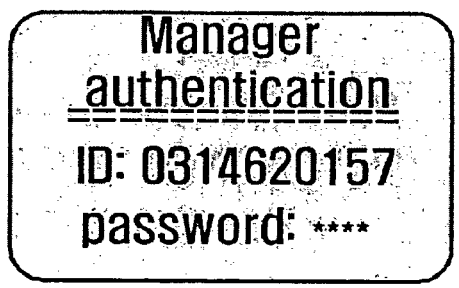
FIG. 9B shows a user interface for receiving a manager ID and password from a user to authenticate a manager.

Next, the control point 190 obtains manager authentication information of controlled device 1 110 set as the master through SOAP. Such manager authentication information may be retrieved from a smart card of the master and is required for a procedure of confirming whether the user that has selected the master is a legitimate manager. The control point 190 performs manager authentication by outputting a user interface using the manager authentication information and receiving a manager's ID and password from the user (S605). FIG. 9*b* shows one example of such a user interface.

After the manager authentication, the control point 190 sets controlled device 1 110 as a domain master and then provides controlled device 1 110 with a list of devices that the control point 190 possesses (S606). Thereafter, the device mode value of controlled device 1 110 becomes "master." Controlled device 1 110 set as the master initially creates a new domain with only the device itself as a member (S607).

FIG. 7 illustrates a device-authenticating process performed subsequent to the process illustrated in FIG. 6 according to the first embodiment of the present invention. First, the domain master 110 receives a new SIB through an external server in such a manner illustrated in FIG. 3 (S611). The control point 190 then delivers URL information with the SIB stored therein to the remaining controlled devices 120 to 160 by using SOAP (S612). The remaining controlled devices 120 to 160 obtain the SIB present in the URL through HTTP (S613). Then, the controlled devices extract secret values using the obtained SIB, and create certificates using the secret values and their own IDs and public keys (S614). These certificates are used for discriminating illegal devices from legitimate devices. For example, if an authentication policy in which only devices produced by specific manufacturers are approved as legitimate devices is enforced, devices produced by other manufacturers except the specific manufacturers would be treated as illegal devices.

Thereafter, when the control point 190 sends URL information containing the certificates to the master device 110 through SOAP (S615), the master device 110 obtains the certificates, device IDs and public keys from the remaining controlled devices 120 to 160 by using HTTP (S615). Further, the master device 110 verifies the obtained certificates and prepares a list of authenticated devices (S617). Devices classified into illegal devices through certificate verification are subsequently excluded from the domain, and there is no possibility for them to be designated as slave devices.

Figure 9C:
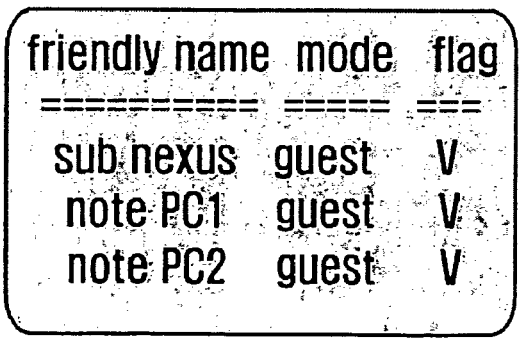
FIG. 9C shows a user interface for receiving a user's selection to select a slave device.

FIG. 8 illustrates the process of determining a slave device that is performed subsequent to the process illustrated in FIG. 7 according to the first embodiment of the present invention. First, the control point 190 verifies domain attributes for the devices 120 to 140 approved as legitimate devices according to the results of the certificate verification by using SOAP (S621). Each domain attribute may include a domain key, the names of devices belonging to a domain, the number of devices belonging to the domain, and the like. If the devices have no domain attributes, the control point 190 displays a list of these devices through a user interface (S622) and allows the user to select slave devices (S623). FIG. 9*c* illustrates an example of a user interface showing a list of the legitimate devices 120 to 140. The user marks checks for devices that the user wishes to include in the domain among the listed devices to select slave devices. Contrary to the selection of the master, the user can select a plurality of devices as slave devices. Thereafter, in the same manner as the master-selecting process illustrated in FIG. 6, manager authentication information is obtained (S624) and the manager-authenticating process is performed (S625).

Next, the control point 190 delivers a list of the slave devices selected among the listed devices to the master device 110 through SOAP (S626), and sets the selected devices to the slave mode through SOAP (S627). The devices that have been set to the slave mode have "slave" as their device mode values. Then, the master device 110 creates a domain ID and a domain key using the list of slave devices (S628). The master device encrypts the domain ID and domain key using public keys for the slave devices (S629).

Next, the control point 190 delivers the URL information containing the domain attribute value from the master device to the slave devices through SOAP (S630). Then, the slave devices obtain the domain attribute present in the URL via HTTP (S631). The domain attribute includes the domain key, the names of the devices belonging to the domain, the number of the devices belonging to the domain, and the like.

Figure 10:
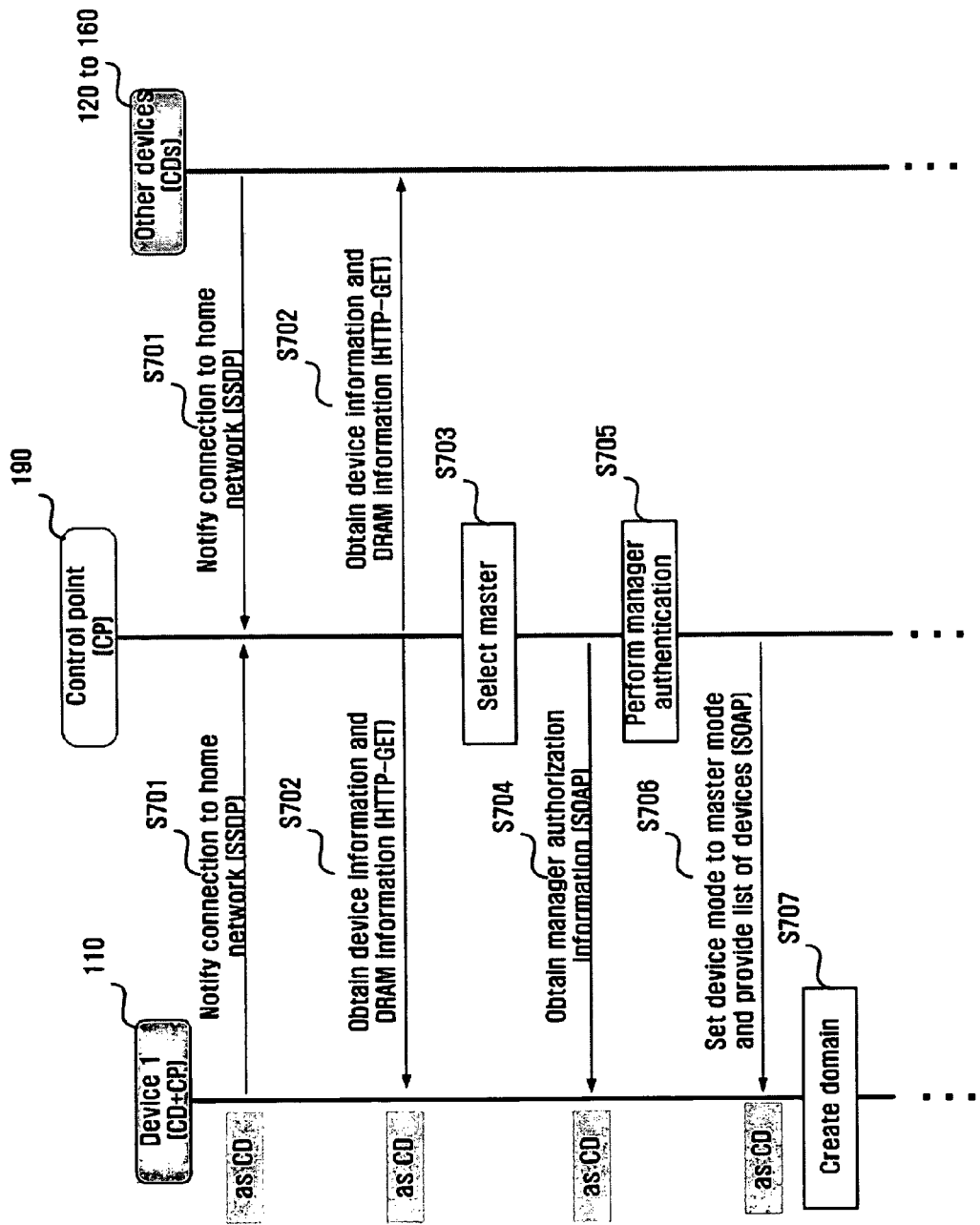
FIG. 10 illustrates the process of determining a master device according to a second embodiment of the present invention.
Figure 11:
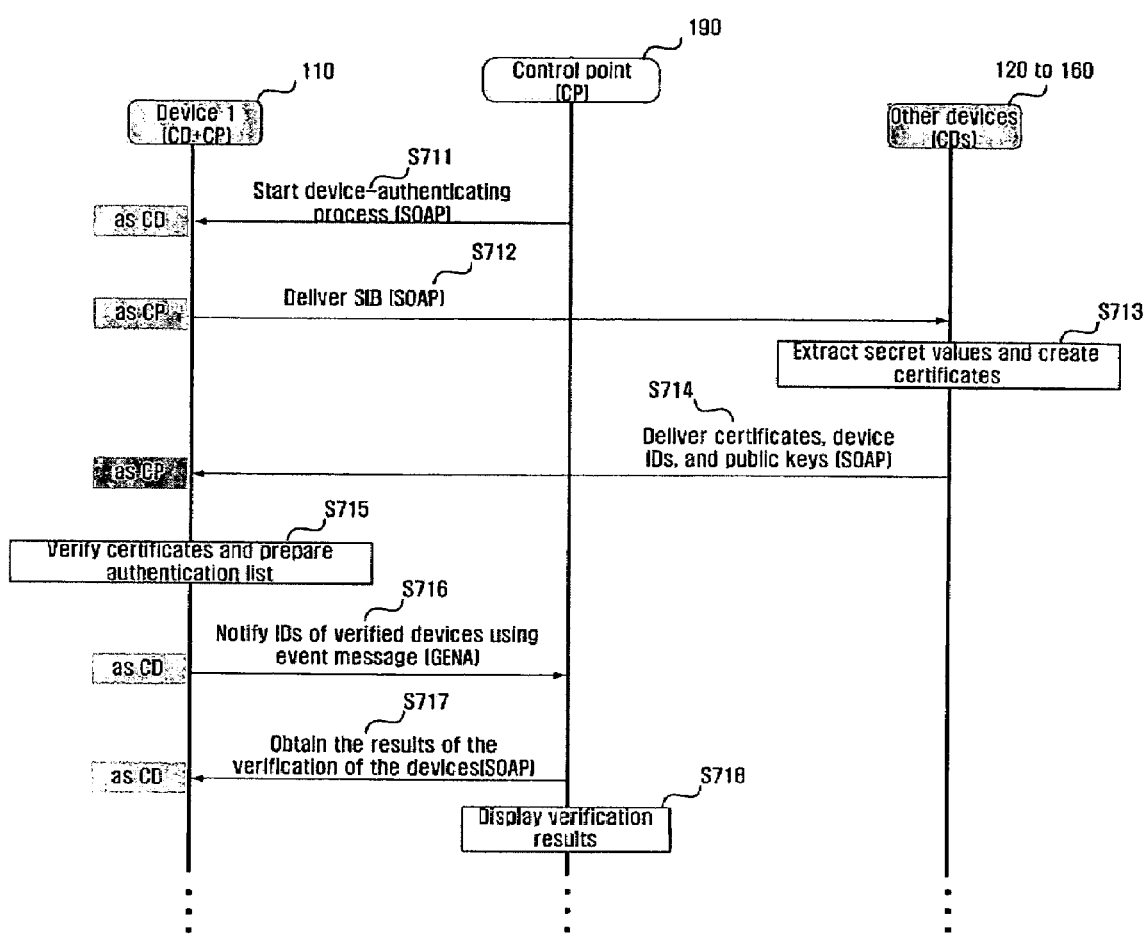
FIG. 11 illustrates a device-authenticating process performed subsequent to the process illustrated in FIG. 10 according to the second embodiment of the present invention.
Figure 12:
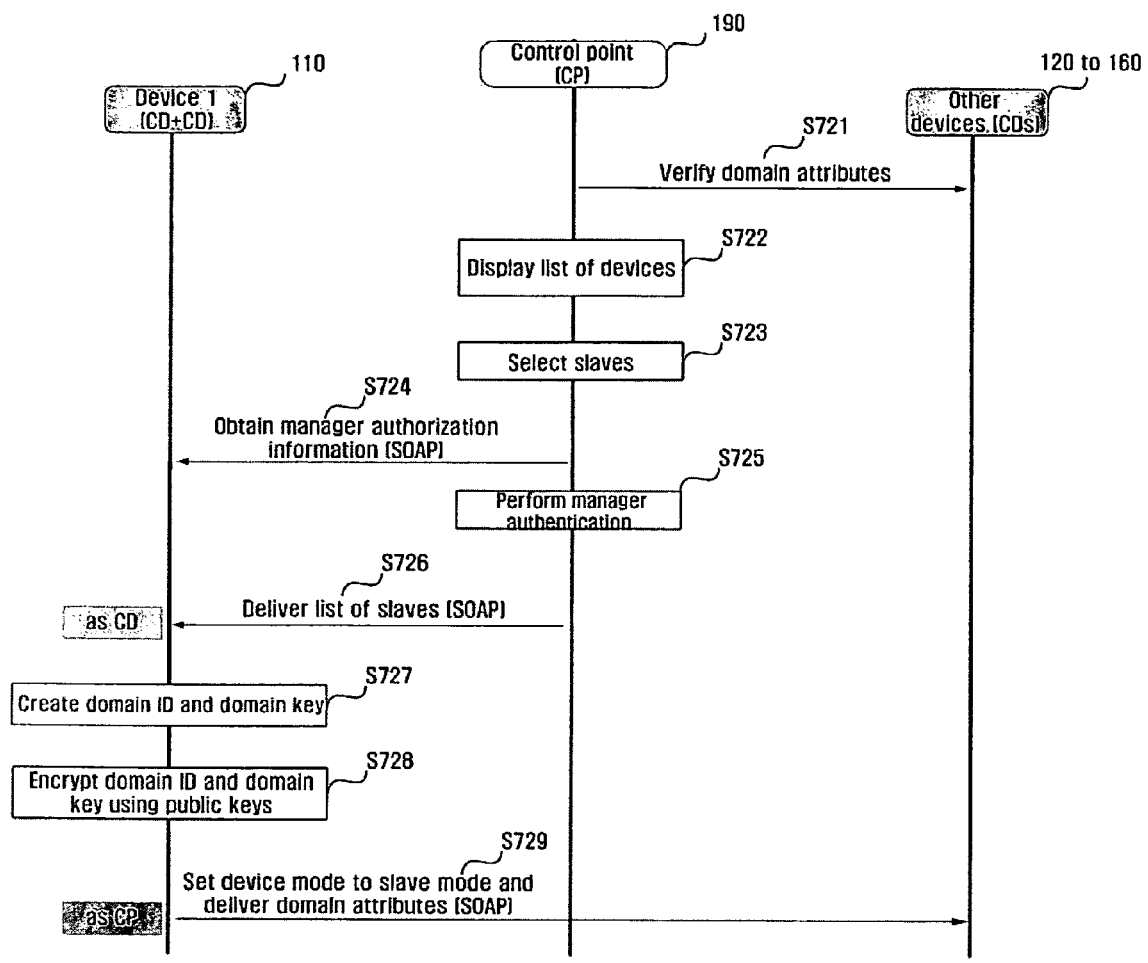
FIG. 12 illustrates the process of determining a slave device that is performed subsequent to the process illustrated in FIG. 11 according to the second embodiment of the present invention.

FIGS. 10 to 12 illustrate processes according to a second embodiment of the present invention. The second embodiment is different from the first embodiment in that important ones of the functions of the control point 190 are taken over by the master device 110. The control point 190 deals with tasks related to user interfaces. As a result, the master device 110 has functions of a controlled device as well as functions of a control point except the residual function of the control point 190. Accordingly, loads on the control point 190 are greatly reduced. Further, problems do not occur in view of security even though the control point 190 is an illegal device. Moreover, there are no problems even though the master device has no user interface.

Among these figures, FIG. 10 illustrates the process of determining a master device, wherein device 1 110 is operated only as a controlled device (CD). Therefore, this process is identical to the process of determining the master device illustrated in FIG. 6 according to the first embodiment. Thus, iterative description thereof will be omitted.

FIG. 11 illustrates a device-authenticating process performed subsequent to the process illustrated in FIG. 10 according to the second embodiment of the present invention. First, the control point 190 notifies the master device 110 through SOAP that the device-authenticating process starts (S711). During this process, the master device is operated as a CD. Then, the master device 110 (operating as a CD) delivers the SIB directly to the remaining controlled devices 120 to 160 using SOAP. Then, the remaining controlled devices 120 to 160 extract secret values using the received SIB, and create certificates using the secrete values and their own device IDs and public keys (S713).

Subsequently, the remaining controlled devices 120 to 160 deliver their certificates, device IDs and public keys directly to the master device 100 (operating as a control point) through SOAP (S714). Then, the master device 110 verifies the received certificates and prepares a list of authentication devices (S715). Devices classified as illegal devices through the certificate verification are subsequently excluded from the domain, and there is no possibility for them to be designated as slave devices. Then, the master device 110 (operating as a CD) notifies the control point 190 of device IDs of the verified devices by means of an event message by using GENA (S716). Then, the control point 190 obtains the results of the verification of the devices from the master device 110 (operating as a CD) using SOAP (S717), and then displays, through a user interface, the verification results on whether the devices are illegal or legitimate devices (S718).

FIG. 12 illustrates the process of determining a slave device that is performed subsequent to the process illustrated in FIG. 11 according to the second embodiment of the present invention. First, the control point 190 verifies domain attributes for the devices 120 to 140 approved as legitimate devices according to the results of certificate verification by using SOAP (S721). If the devices have no domain attributes, the control point 190 displays a list of these devices through a user interface (S722), and allows the user to select slave devices (S723). FIG. 9c illustrates an example of the user interface showing a list of legitimate devices 120 to 140. The user marks checks for devices that the user wishes to include in the domain among the listed devices to select slave devices. Thereafter, in the same manner as the master-selecting process illustrated in FIG. 6, the manager authentication information is obtained (S724) and the manager-authenticating process is performed (S725).

Next, the control point 190 delivers a list of slave devices 120 to 140 selected among the listed devices to the master device 110 (operating as a CD) through SOAP (S726). Then, the master device 110 creates a domain ID and a domain key using the list of slave devices (S727). Then, the master device encrypts the domain ID and domain key using public keys for the slave devices (S728). The master device 110 (operating as a control point) directly sets the selected devices to the slave mode through SOAP, and then delivers the domain attributes of the set devices (S729).

According to the present invention, there are advantages in that it possible to construct a domain independent of the outside by using a public key-based architecture in which a user is directly involved in constructing the domain, and a domain key is created using a authentication list and a random number as input values and thus varies depending on changes in members belonging to the domain, thereby more safely limiting the use of content.

Further, according to the present invention, there is an advantage in that since a communication method implemented in UPnP can be used as it is in applying domain management techniques to a home network, it is not necessary to develop a new communication method among members in a domain. Further, the present invention has advantages in that devices included in a home network can be more easily authenticated, smooth incorporation into conventional networks can be made without depending on specific operating systems or physical media by using a standard Internet protocol, and compatibility with all devices supporting UPnP can be achieved.

Although the embodiments of the present invention have been described with reference to the accompanying drawings, it can be understood by those skilled in the art that the present invention can be implemented in other specific forms without modifying or changing the technical spirit and essential features thereof. Therefore, it should be understood that the aforementioned embodiments are not limitative but illustrative in all aspects. The scope of the present invention should be defined by the appended claims, and all changes or modifications made from the spirit and scope of the invention and equivalents thereof should be construed as falling within the scope of the invention.

What is claimed is:

1. A method of constructing a domain a domain based on a public key and implementing the domain using universal plug and play (UPnP) so that a unique domain grants only an authorized user to use content in a public-key based architecture in a home network, comprising:
   (a) selecting one of controlled devices that are operable as a master device and determining the selected one of the controlled devices, as the master device;
   (b) performing device authentication in such a manner that other controlled devices receive a secret informnation block from the determnined master device and create certificate; and
   (c) determnining slave device by selecting one or more devices among authenticated controlled devices,
   wherein selecting the master device and the slave devices are performned by means of user selection through user interfaces.

2. The method as claimed in claim 1,
   wherein the step (a) comprises:
   notifying a control point that the controlled devices are connected;
   obtaining, by the control point, device information and digital rights management (DRM) information of the controlled devices;
   selecting the master device among the controlled devices by using the DRM information; and
   setting the one of the controlled devices selected as the master device, to a master mode and providing a list of devices to the controlled devices.

3. The method as claimed in claim 1, wherein the step (b) comprises:
   receiving, by the determined master device, the secret information block from an external server;
   delivering the received secret information block to the controlled devices except the master device;
   extracting secret values and creating the certificates using the delivered secret information block; and
   verifying the certificates and preparing a list of authenticated devices by using the created certificates, device IDs and public keys.

4. The method as claimed in claim 1, wherein the step (c) comprises:
   if the devices authenticated in the (b) step have no domain attributes, displaying a list of the devices authenticated in the step (b), to the user;
   selecting the slave devices among the listed devices;
   receiving a list of the selected slave devices and creating a domain ID and a domain key; and
   encrypting the domain ID and the domain key using public keys.

5. The method as claimed in claim 1, wherein one or more functions of a control point in UPnP are taken over by the master device, and the control point relates to tasks related to user interfaces.

6. The method as claimed in claim 2, where the control point takes over important ones of said one or more functions.

7. The method as claimed in claim 1, wherein the master device and the slave devices are determined after manager authentication is performed by obtaining manager authentication information from the master device.

* * * * *